United States Patent
Mangrulkar et al.

(10) Patent No.: US 10,868,713 B1
(45) Date of Patent: *Dec. 15, 2020

(54) DYNAMIC CONFIGURATION OF ENODEB TO FACILITATE CIRCUIT SWITCHED FALLBACK SERVICE

(71) Applicant: Sprint Spectrum L.P., Overland Park, KS (US)

(72) Inventors: Sandeep Mangrulkar, Chantilly, VA (US); Yun Sung Kim, Ashburn, VA (US); Tri Duong, Annandale, VA (US); Sanghoon Sung, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,965

(22) Filed: Jul. 29, 2019

Related U.S. Application Data

(63) Continuation of application No. 15/889,826, filed on Feb. 6, 2018, now Pat. No. 10,432,453.

(51) Int. Cl.
| | |
|---|---|
| *H04L 12/26* | (2006.01) |
| *H04L 12/24* | (2006.01) |
| *H04W 76/15* | (2018.01) |
| *H04J 13/16* | (2011.01) |
| *H04W 88/06* | (2009.01) |

(52) U.S. Cl.
CPC .............. *H04L 41/08* (2013.01); *H04J 13/16* (2013.01); *H04W 76/15* (2018.02); *H04W 88/06* (2013.01)

(58) Field of Classification Search
CPC . H04W 76/15; H04W 36/0022; H04W 48/18; H04L 41/08; H04J 13/16
See application file for complete search history.

(56) References Cited

U.S. PATENT DOCUMENTS

| | | | |
|---|---|---|---|
| 8,958,801 | B2 | 2/2015 | Ryu et al. |
| 2009/0264130 | A1 | 10/2009 | Catovic et al. |
| 2014/0113636 | A1 | 4/2014 | Lee et al. |
| 2014/0378129 | A1 | 12/2014 | Jiang et al. |
| 2016/0044546 | A1* | 2/2016 | Yang ...................... H04W 76/10 370/331 |
| 2016/0057607 | A1* | 2/2016 | Dubesset ................ H04W 8/06 455/433 |
| 2017/0201923 | A1 | 7/2017 | Yang et al. |

\* cited by examiner

*Primary Examiner* — Rebecca E Song
*Assistant Examiner* — Nourali Mansoury

(57) ABSTRACT

A method and corresponding system for configuring an eNodeB for improved circuit-switched-fallback (CSFB) service. The method includes detecting that, during past CSFB call setup for UEs served by the eNodeB, UEs reported as a strongest fallback coverage area a fallback coverage area that is not included in the eNodeB's CSFB-candidate data. And the method includes responsively (i) determining, based on location information and based on an identifier of the reported fallback coverage area, a node of the fallback network that the eNodeB's network can contact to facilitate CSFB call setup in the reported fallback coverage area, and (ii) adding to the CSFB-candidate data a record of the reported coverage area in association with a node identifier of the determined node, the added record being thereafter useable by the eNodeB to facilitate CSFB call setup in the reported fallback coverage area for a UE served by the eNodeB.

17 Claims, 3 Drawing Sheets

DYNAMIC CONFIGURATION OF ENODEB TO FACILITATE CIRCUIT SWITCHED FALLBACK SERVICE

REFERENCE TO RELATED APPLICATION

This is a continuation of U.S. patent application Ser. No. 15/889,826, filed Feb. 6, 2018, the entirety of which is hereby incorporated by reference.

BACKGROUND

A cellular wireless network typically includes a number of base stations that are configured to provide wireless coverage areas, such as cells and cell sectors, in which user equipment devices (UEs) such as cell phones, tablet computers, tracking devices, embedded wireless modules, and other wirelessly equipped communication devices (whether or not user operated), can operate. In turn, each base station could be coupled with network infrastructure that provides connectivity with one or more transport networks, such as the public switched telephone network (PSTN) and/or the Internet for instance. With this arrangement, a UE within coverage of the network could engage in air interface communication with a base station and could thereby communicate via the base station with various remote network entities or with other UEs served by the base station.

Such a network could operate in accordance with a particular air interface protocol (or radio access technology), with communications from the base stations to UEs defining a downlink or forward link and communications from the UEs to the base stations defining an uplink or reverse link. Examples of existing air interface protocols include, without limitation, Long Term Evolution (LTE) (using Orthogonal Frequency Division Multiple Access (OFDMA) and Single-Carrier Frequency Division Multiple Access (SC-FDMA)), Code Division Multiple Access (CDMA) (e.g., 1×RTT and 1×EV-DO), Global System for Mobile Communications (GSM), WI-FI, and BLUETOOTH, among other examples. Each protocol could define its own procedures for registration of UEs, initiation of communications, handoff between coverage areas, and other functions related to air interface communication.

In accordance with the air interface protocol, each coverage area could operate on one or more carrier frequencies and could define on each carrier a number of air interface channels for carrying information between the base station and UEs. These channels could be defined in various ways, such as through frequency division multiplexing, time division multiplexing, and/or code-division multiplexing for instance.

By way of example, on a given carrier frequency, a coverage area could be structured to define a pilot channel or reference channel on which the base station broadcasts a pilot signal or reference signal that UEs could detect as an indication of coverage and could measure to evaluate coverage strength. Further, the coverage area could define one or more uplink control channels on which UEs could transmit control messages such as access requests, registration requests, and scheduling requests to the base station. And the coverage area could define one or more downlink control channels on which the base station could transmit control messages such as scheduling directives, system information messages, and page messages to UEs. Each coverage area could then further define one or more traffic channels or other resource for carrying communication traffic such as voice data and other data between the base station and served UEs.

In some arrangements, when a UE first powers on or enters into coverage of the network, the UE could scan for and identify a strongest pilot or reference signal and could register with the network by transmitting a registration request or attach request to a base station providing that signal. This registration process could serve to notify the network of UE's presence in a particular coverage area and could facilitate network authentication of the UE. Once registered, the UE could then operate in an idle mode in which the UE has no assigned traffic channel resources on which to engage in bearer communication but the UE monitors a downlink control channel to receive overhead information and to check for any page messages.

When the network has a communication (such as a voice call or other traffic) to provide to a UE that is registered with the network but is operating in the idle mode, the network could page the UE in an effort to then facilitate assigning traffic channel resources to the UE. In particular, the network could transmit on the downlink a page message addressed to the UE. Assuming the UE receives this page message, the UE could then transmit to the network a page response message on the uplink. And upon receipt of the page response message, the network could then assign traffic channel resources to the UE, for use to carry the communication, thus transitioning the UE to a connected or active mode in which the UE could engage in the communication.

Likewise, when an idle UE seeks to initiate (originate) a communication, such as to place a voice call or engage in other bearer communication, the UE could transmit on the uplink to the base station an origination or connection request, and the network could then assign traffic channel resources to the UE for use to carry the communication, similarly transitioning the UE to a connected or active mode in which the UE can engage in the communication.

OVERVIEW

In communication systems that provide service under more than one air interface protocol, service providers could implement functionality that allows UEs to operate on one air interface protocol and to dynamically switch over to operate on another air interface protocol to engage in certain communications. By way of example, in a system that supports both LTE service for mobile broadband and another protocol such as CDMA or GSM for traditional voice calls, service providers could implement "circuit switched fallback" (CSFB) functionality, which allows UEs to operate by default on LTE and to switch over to operate on CDMA or GSM to engage in voice calls.

In a typical CSFB implementation with LTE and CDMA, signaling infrastructure of the LTE network is connected via an inter-network interface (e.g., an S102 interface) with an interworking server (IWS) of the CDMA network, to allow control signaling to flow between the LTE and CDMA networks. A CSFB-capable UE could then be arranged by default to scan for and register (attach) via an LTE air interface with the LTE network and, once so registered, to then register with the CDMA network via the LTE air interface and LTE network, thereby informing the CDMA network that the UE is accessible via the LTE network. The UE could then operate with LTE service until it becomes necessary to place or receive a voice call. And to then place or receive a voice call, the UE could conveniently engage in call setup signaling with the CDMA network via the LTE network and then transition from LTE service to CDMA service to engage in the call.

As a more specific example of this, after a UE connects with an LTE base station, namely an evolved Node B (eNodeB), and attaches with the LTE network, the UE could then transmit a CDMA registration message via the LTE air interface to the LTE base station. The CDMA registration message could then pass via the eNodeB to a mobility management entity (MME) of the LTE network and from there via the S102 interface to the IWS and in turn to a mobile switching center (MSC) of the CDMA network. The MSC could thus record the fact that the UE is accessible via the LTE network (namely, via the IWS and S102 interface with the MME).

Once the UE is so registered with the CDMA network and is operating in LTE service, if the UE seeks to place a voice call, the UE could transmit an extended service request (ESR) message to the eNodeB, to which the eNodeB could respond by directing the UE to scan for CDMA coverage. The UE could then scan for and measure CDMA coverage on one or more frequencies and transmit to the eNodeB a report of detected CDMA coverage, such as a report specifying each of one or more CDMA coverage areas that the UE found to be at least threshold strong. For instance, the UE's report could specify for each such CDMA coverage area a pseudo-random noise offset (PN offset) and frequency of the CDMA coverage area. And the eNodeB could then respond by directing the UE to proceed with CDMA call-setup signaling. And the UE could responsively generate and transmit to the eNodeB a CDMA call-setup message, in this case a CDMA call origination message (ORM).

Alternatively, if the MSC has an incoming call to connect to the UE, the MSC could page the UE by transmitting a CDMA page message via the IWS and S102 interface to the MME, causing the MME to coordinate paging of the UE by the eNodeB. And in response to the paging of the UE, the UE could then similarly send an ESR to the eNodeB, receive a measurement directive from the eNodeB, and measure and report CDMA coverage, and the eNodeB could similarly direct the UE to proceed with CDMA call-setup signaling. And the UE could responsively generate and transmit to the eNodeB a CDMA call-setup message, in this case a CDMA page response message (PRM).

Whether an ORM or a PRM, the eNodeB could then forward the UE's CDMA call-setup message to the MME, and the MME could forward the message over the S102 interface to the IWS for transmission in turn to the MSC. Further, the eNodeB could then generate and transmit to the MME a set of CDMA Reference Cell ID information that carries information about CDMA coverage area that the UE reported to be strongest, and the MME could forward that information via the S102 interface to the IWS to facilitate signaling in turn to the MSC for handling.

The MSC could then set up the call in the indicated CDMA coverage area. And the MSC and IWS could transmit to the UE, via the S102 interface and the MME and the LTE base station, a directive for the UE to switch from LTE service to CDMA service so as to engage in the call in that CDMA coverage area. For instance, the MSC and IWS could transmit to the UE a Universal Handoff Direction Message (UHDM) or an enhanced Channel Assignment Message (eCAM) to cause the UE to switch from LTE to CDMA so as to facilitate engaging in the call via CDMA.

This CSFB call setup process assumes that when the MME receives the CDMA Reference Cell ID information from the eNodeB, the MME will be able to signal to the IWS and the IWS will be able to signal to the MSC to facilitate call setup in the indicated CDMA coverage area. In a representative system, however, there may be multiple MSCs (e.g., one per geographic region), each serving a respective set of CDMA coverage areas. Further, each MSC could be integrated with a respective IWS, or there could also be multiple IWSs, each serving a respective set of MSCs. In either case, given an identity of the CDMA coverage area at issue (e.g., the strongest CDMA coverage area reported by the UE), the eNodeB may need to map (correlate or translate) that CDMA coverage area ID to the associated MSC and perhaps to the associated IWS, so that the eNodeB can correctly specify the MSC and/or IWS in the CDMA Reference Cell ID information that the eNodeB sends to the MME, and signaling could then pass to the MSC that could set up the call in the indicated CDMA coverage area.

To facilitate this in practice, the eNodeB could be provisioned (configured) with a set of CSFB-candidate data that specifies this information for each of various CDMA coverage areas. In particular, this CSFB-candidate data could be stored at or otherwise accessible by the eNodeB and could identify each of various CDMA coverage areas (e.g., by PN offset and frequency) and specify for each CDMA coverage area a respective MSC ID (e.g., market ID, switch number, base station ID, and sector ID) and/or a respective IWS ID. This way, when a UE has reported a particular CDMA coverage area as being the strongest that the UE detected, the eNodeB could transmit to the MIME a set of CDMA Reference Cell ID information that identifies that CDMA coverage area and that further specifies the MSC ID and/or IWS ID to facilitate signaling in turn to the correct MSC.

An eNodeB could be provisioned with this CSFB-candidate information at the time the eNodeB is put into service and/or when changes are made in the LTE and/or CDMA network. Optimally, the CSFB-candidate information would encompass CDMA coverage areas that are co-located with the eNodeB's coverage area and/or that are adjacent to the eNodeB's coverage area. That way, when a UE is being served by the eNodeB, the CDMA coverage area that the UE reports as strongest for CSFB call setup should be specified in the CSFB-candidate data.

Unfortunately, however, there could be scenarios where the strongest CDMA coverage that the UE reports for CSFB call setup is not included in the eNodeB's CSFB-candidate data. For instance, this could occur if the UE is operating at a distant edge of the eNodeB's coverage area and where a distant CDMA base station provides "boomer" coverage where the UE is located. Or this could happen if new or changed CDMA extending to the UE's location has been put into service but, for one reason or another, the eNodeB's CSFB-candidate data was not updated to include that CDMA coverage area. Other reasons could exist as well.

When this happens, the eNodeB may be unable to process setup of the UE's CSFB call in the UE's strongest reported CDMA coverage area. Instead, in this situation, the eNodeB may have to resort to CSFB setup in the next strongest UE reported CDMA coverage area (if any) that is included IN the eNodeB's CSFB-candidate data. Thus, the eNodeB could refer to its CSFB-candidate data to determine the MSC ID and/or IWS ID associated with that next strongest reported CDMA coverage area and could pass that information to the MME to facilitate signaling to set up the CSFB call in that next strongest reported CDMA coverage area.

The end result of setting up a CSFB call in a sub-optimal fallback coverage area as in this situation this is undesirable. Therefore, an improvement is desired.

In accordance with the present disclosure, an eNodeB a serving network will monitor history of CSFB call setup for UEs served by the eNodeB and will thereby detect that, during past CSFB call setup for those UEs (e.g., in a predefined threshold number of instances), the UEs each reported as a strongest fallback coverage area a fallback coverage area that is not included in the eNodeB's CSFB-candidate data. In response to detecting this, the eNodeB will then automatically engage in a process to supplement its CSFB-candidate data with information about the fallback coverage area at issue. In particular, based on the identity of the reported fallback coverage area and based on location information (such as geographic location of the eNodeB and/or of the reporting UEs), the eNodeB will determine a node (e.g., MSC and/or IWS) of the fallback network that the serving network can contact to facilitate CSFB call setup in the reported fallback coverage area. And the eNodeB will add to its CSFB-candidate data a record of the reported fallback coverage area in association with an identifier of the determined node (e.g., MSC ID and/or IWS ID).

This way, the next time the eNodeB faces a UE reporting the fallback coverage area at issue as the strongest that the UE detected for CSFB call setup, the eNodeB could then optimally obtain information about that fallback coverage area from the eNodeB's CSFB-candidate data. Thus, the eNodeB could then provide that information to the MME so as to enable the MME to engage in signaling with the appropriate IWS and/or MSC, to thereby facilitate CSFB call setup in that fallback coverage area rather than resorting to CSFB call setup in a next strongest reported fallback coverage area (if any).

These as well as other aspects and advantages will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system that includes an LTE network and a legacy CDMA network. It should be understood, however, that the disclosed principles can extend to other air interface protocols and other network arrangements as well, with variations where appropriate. Further, even within the context of the hybrid LTE-CDMA system described, numerous variations from the specific arrangements and processes described are possible. For instance, various described machines, connections, functions, and other elements could be added, omitted, distributed, re-located, re-ordered, combined, or changed in other ways.

Figure 1:
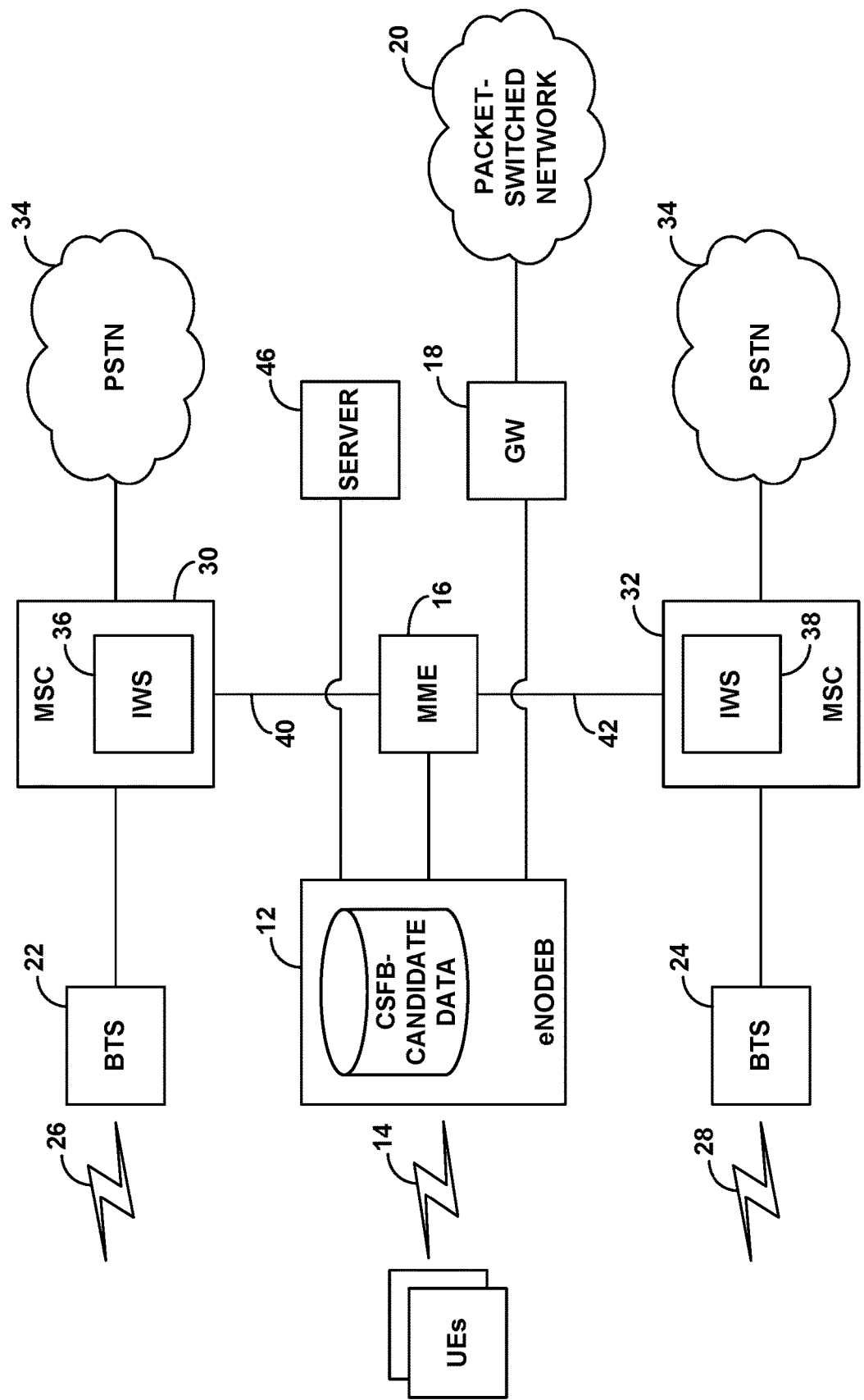
FIG. 1 is a simplified block diagram of an example network arrangement in which aspects of the present disclosure can be implemented.

FIG. 1 is a simplified block diagram of a hybrid system including an LTE network and a CDMA network. The LTE network is shown including an example eNodeB 12, which provides an LTE coverage area 14, and which is interfaced through a core network with an MME 16 and with a gateway system 18 that provides connectivity with a packet-switched transport 20 such as the Internet. The CDMA network, on the other hand is shown including two example CDMA base stations (base transceiver stations (BTSs)) 22, 24, each of which provides a separate respective CDMA coverage area 26, 28. And each BTS operates in a local serving system defined by a separate respective MSC 30, 32 that provides connectivity with the PSTN 34. Further each MSC is further shown by way of example including a respective IWS 36, 38, and the MME 16 of the LTE network is shown having an S102 interface 40, 42 respectively with each MSC and/or IWS.

With this example arrangement, each of multiple representative UEs 44 could initially establish an LTE connection with eNodeB 12 in coverage area 14 and could attach with the LTE network, so that the UEs could then engage in packet-data communication on transport network 20 via the LTE air interface and the LTE network.

Further, once each such UE is connected/attached with the LTE network, the UE could also engage in CSFB pre-registration with the CDMA network. For instance, the UE could transmit a CDMA registration message to the eNodeB, which the eNodeB could forward to the MME, and the MME could forward the registration message via an S102 interface to a default MSC/IWS, perhaps one deemed in advance to correspond with the eNodeB. The MSC could then engage in signaling with a CDMA home location register (HLR), to record the fact that the UE is accessible (e.g., for CDMA paging) via the MME and the LTE network.

In the example arrangement, the eNodeB is configured with a set of CSFB-candidate data 46 as discussed above. To simplify illustration of the present advance, we can assume that the CSFB-candidate data 44 in this example includes information for CDMA coverage area 26 (provided by BTS 22) but does not include information for CDMA coverage area 28 (provided by BTS 24). In particular, the CSFB-candidate data could list CDMA coverage area 26 by its PN offset and frequency and could specify for CDMA coverage area 26 an identifier of MSC 30 and/or IWS 36, but the CSFB-candidate data could exclude any listing of CDMA coverage area 28 (e.g., may not list the PN offset and frequency of CDMA coverage area 28).

While UEs 44 are at various times served by eNodeB 12, it may happen that, as the UEs engage in CSFB call setup, each UE may report CDMA coverage area 28 as the strongest CDMA coverage area that the UE detects and may report CDMA coverage area 26 as the second-strongest CDMA coverage area that the UE detects. However, since the CSFB-candidate data maintained by eNodeB 12 does not list CDMA coverage area 28, eNodeB 12 may in each instance be forced to proceed with CSFB call setup in the second-strongest reported CDMA coverage area 28 rather than in the strongest reported CDMA coverage area 26.

Per the present disclosure, the eNodeB could keep track of such occurrences over time. For instance, each time a UE served by the eNodeB is engaged in CSFB call setup and reports to the eNodeB as the UE's strongest detected CDMA coverage area a CDMA coverage area that the eNodeB determines is not included the eNodeB's CSFB-candidate data, the eNodeB could record in data storage a record of that occurrence. The eNodeB could maintain such records keyed to CDMA coverage area identifiers (e.g., PN offsets and frequencies), perhaps as a count of occurrences per CDMA coverage area, and possibly a rate of occurrence per CDMA coverage area per unit time.

Further, the eNodeB could monitor these records to determine when the number or rate of occurrences for any particular CDMA coverage area has reached or exceeded a predefined threshold (such as a number between two and tens or hundreds, perhaps per unit time). And when the eNodeB detects such a threshold extent of occurrence for a particular CDMA coverage area, the eNodeB could then automatically take action to supplement the eNodeB's CSFB-candidate data so as to help avoid the issue with that particular CDMA coverage area moving forward.

To resolve the issue for CDMA coverage area at issue, the eNodeB could perform or trigger a database lookup keyed to the CDMA coverage area identifier and to associated location information in order to determine a node of the CDMA network, such as an IWS and/or MSC, that the LTE network could contact to facilitate CSFB call setup in that CDMA coverage area—and perhaps to determine other associated information. And the eNodeB could then add to its CSFB-candidate data a record for the CDMA coverage at issue, including an identity of the CDMA coverage area and an identity of the determined node of the CDMA network. In this way, the eNodeB would thus automatically configure itself to facilitate improved CSFB service, as the eNodeB would revise its CSFB-candidate data to facilitate CSFB call setup when appropriate in the CDMA coverage area at issue.

In an example implementation, the eNodeB could query a network server 46 to determine the desired information about the CDMA coverage area, based on the identifier of the CDMA coverage area and based on associated location information. The server could reside on the LTE core network at a predefined address or could otherwise be accessible directly or indirectly to respond to eNodeB queries such as this. As an example, the server could be an centralized self-organizing-network (CSON) server or other server that has an interface with a CDMA operations support system (OSS) or planning server. Alternatively, the server could take other forms.

The server could maintain or otherwise have access to mapping/planning data that plots or otherwise indicates geographic locations of various CDMA coverage areas and indicates for each CDMA coverage area a respective identification of the CDMA coverage area an identification of an IWS and/or MSC to which the CDMA coverage area is homed. The server could maintain or have access to this information in a relational database format or other structure.

The geographic location of each CDMA coverage area could include geographic coordinates defining a polygon or other geometric shape that approximates the coverage area, geographic coordinates of a centroid location of the coverage area, and/or geographic coordinates of the position of the BTS antenna that provides the coverage area, among other possibilities. Further, the geographic location information for each CDMA coverage area could include antenna beam direction information, such as azimuth and/or tilt information, or the like. The CDMA coverage area identification could include PN offset and frequency, among other possibilities. And the IWS and/or MSC identification could take the form of an IWS ID and/or MSC ID that would facilitate signaling from the MME to an IWS or MSC and/or from an IWS to an MSC, for CSFB call setup in the CDMA coverage area.

The eNodeB's query to the server could seek to determine which CDMA coverage area is most likely to be the CDMA coverage area that has the CDMA coverage area identification reported by UEs and that has a geographic location consistent with those UE reports. One consideration here could be which CDMA coverage area having the identifier at issue is geographically closest to the eNodeB and/or geographically closest to where the UEs were located when they reported the CDMA coverage area, possibly factoring in beam directions and/or other information as well.

As one example, the eNodeB's query to the server could provide the server with geographic location (e.g., pre-stored latitude/longitude coordinates) of the eNodeB and with the CDMA coverage area identification. And the server could responsively determine which CDMA coverage area is geographically closest to the eNodeB location.

As another example, each time a UE served by the eNodeB provides a CDMA measurement report for CSFB call setup, the UE could report to the eNodeB the UE's geographic location or the eNodeB could otherwise determine the geographic location of the UE. As the eNodeB records the occurrence of a reported CDMA coverage area not being in the eNodeB's CSFB-candidate data, the eNodeB could thus also include in that record an indication of the reporting UE's geographic location. The eNodeB's query to the server could then provide the server with information about those UE geographic locations, such as an average or other statistical measure of the UE locations, along with the CDMA coverage area identification. And the server could then responsively determine which CDMA coverage area is geographically closest to where the UEs that reported the CDMA coverage area were located.

In either case, the server could then return to the eNodeB an IWS ID and/or MSC ID for the IWS and/or MSC to which that CDMA coverage area is homed. And the eNodeB could responsively add to the eNodeB's CSFB-candidate data a record for that CDMA coverage area, keyed to the CDMA coverage area identification and specifying the determined IWS and/or MSC ID. The next time a UE served by the eNodeB is then engaged in CSFB call setup and reports that CDMA coverage area as the UE's strongest detected CDMA coverage area, the eNodeB could thus successfully provide the MME with CDMA Reference Cell ID information including the IWS ID and/or MSC ID to facilitate CSFB call setup in that strongest CDMA coverage area, rather than having to resort to CSFB call setup in a next strongest reported CDMA coverage area (if any).

Figure 2:
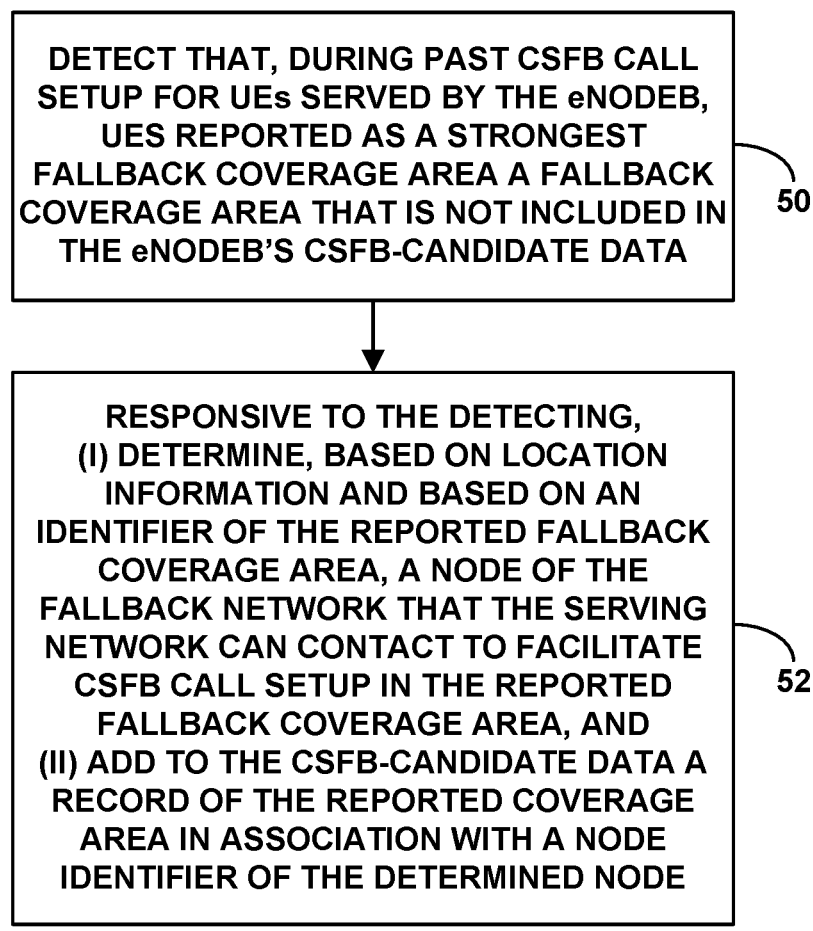
FIG. 2 is a flow chart depicting operations that can be carried out in accordance with the disclosure.

FIG. 2 is a flow chart depicting a method that could be carried out by an eNodeB in accordance with the present disclosure, to configure the eNodeB for improved CSFB service. In line with the discussion above, the eNodeB could be part of a serving network that operates in accordance with a first radio access technology (e.g., LTE or another), and the server network could be interconnected with a fallback network that operates according to a second radio access technology (e.g., CDMA, GSM, or another) different than the first radio access technology and that provides a plurality of fallback coverage areas. Further in line with the discussion above, the eNodeB maintains CSFB-candidate data specifying a proper subset the fallback coverage areas (i.e., some but less than all of the fallback coverage areas) as CSFB candidates.

As shown in FIG. 2, at block 50, the method includes the eNodeB detecting that, during past CSFB call setup for UEs served by the eNodeB, the UEs reported as a strongest fallback coverage area a fallback coverage area that is not included in the CSFB-candidate data. Further, at block 52, the method includes, responsive to the detecting, (i) the eNodeB determining, based on location information and based on an identifier of the reported fallback coverage area, a node of the fallback network that the serving network can contact to facilitate CSFB call setup in the reported fallback coverage area, and (ii) the eNodeB adding to the CSFB-candidate data a record of the reported coverage area in association with a node identifier of the determined node, such that the added record is thereafter useable by the eNodeB to facilitate CSFB call setup in the reported fallback coverage area for a UE served by the eNodeB.

As further discussed above, the act of the eNodeB detecting that, during past CSFB call setup for UEs served by the eNodeB, the UEs reported as a strongest fallback coverage area the fallback coverage area that is not included in the CSFB-candidate data could involve (i) the eNodeB detecting a predefined threshold number of instances of the eNodeB having received a UE report of the fallback coverage area as a strongest fallback coverage area for CSFB call setup (e.g., separate such UE reports), the predefined threshold number of instances being at least two and (ii) the eNodeB determining that the fallback coverage area is not included in the CSFB-candidate data. As noted above, in each such instance, because the reported fallback coverage area was not included in the CSFB-candidate data, the eNodeB may have instead processed CSFB call setup in a second-strongest reported fallback coverage area.

As also discussed above, the act of the eNodeB determining, based on the location information and based on the identifier of the reported fallback coverage area, the node of the fallback network that the serving network can contact to facilitate CSFB call setup in the reported fallback coverage area could involve the eNodeB querying a network server to determine, based on the location information and based on an identifier of the reported fallback coverage area, the node of the fallback network that the serving network can contact to facilitate CSFB call setup in the reported fallback coverage area. And as noted above, the location information could comprise a geographic location of the eNodeB and/or geographic locations of the UEs that reported the fallback coverage area as the strongest fallback coverage area.

In addition, as discussed above, the determined node of the fallback network could be an IWS, and the eNodeB could use the added record to facilitate CSFB call setup in the reported fallback coverage area by providing the node identifier to an MME of the serving network to enable the MME to engage in signaling with the identified IWS. For this purpose, the MME could have data that maps the IWS identifier to a corresponding S102 interface, so that the MME can engage in signaling on the S102 interface with the identified IWS.

Alternatively or additionally, the determined node of the fallback network could be an MSC, and the eNodeB could the added record to facilitate CSFB call setup in the reported fallback coverage area by providing the node identifier to an MME for communication of the node identifier from the MME to an IWS to facilitate signaling from the IWS to the MSC.

In one implementation, for instance, the eNodeB could determine from its server query both an IWS ID and an MSC ID for the CDMA coverage area at issue and could add to the eNodeB's CSFB-candidate data a record for the CDMA coverage area specifying both of those identifiers. For subsequent CSFB call setup in that CDMA coverage area, the eNodeB could then provide the MME with CDMA Reference Cell ID information that specifies both the IWS ID and the MSC ID. The MME could use the IWS ID to facilitate signaling to the appropriate IWS and could pass the CDMA Reference Cell ID information to that IWS, and the IWS could then use the MSC ID to facilitate signaling to the appropriate MSC, to facilitate CSFB call setup in the CDMA coverage area.

Figure 3:
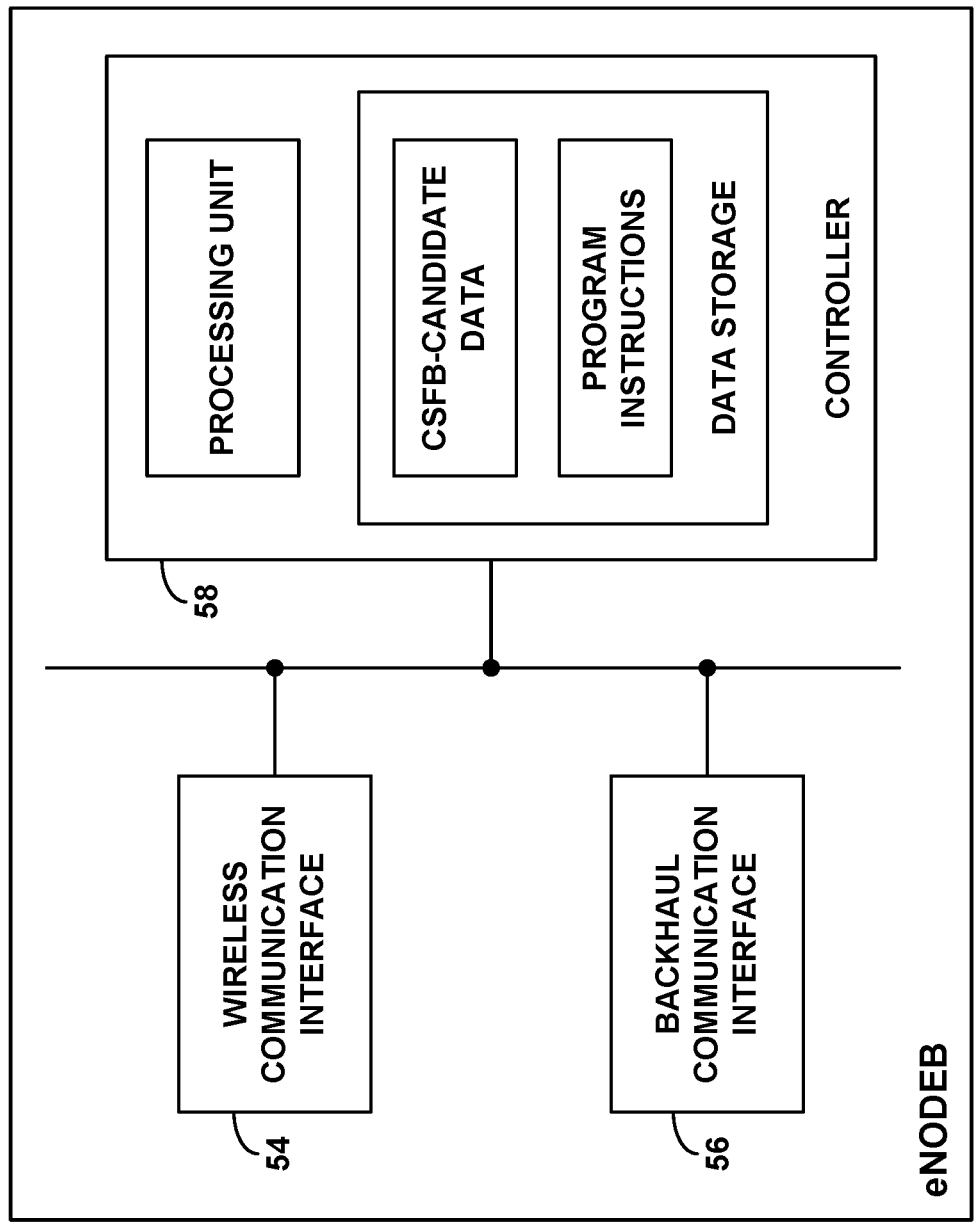
FIG. 3 is a simplified block diagram of an example eNodeB operable in an example implementation.

FIG. 3 is a simplified block diagram of an eNodeB operable in line with the discussion above. This eNodeB could take various forms, examples of which include a macro eNodeB, a small cell eNodeB, a femtocell eNodeB, and a relay eNodeB, among other possibilities. In line with the discussion above, the eNodeB is operable to configure itself to facilitate improved CSFB service, where the eNodeB is part of a serving network that operates according to a first radio access technology (e.g., LTE or others), where the serving network is interconnected with a fallback network that operates according to a second radio access technology (e.g., CDMA, GSM or others) different than the first radio access technology and that provides a plurality of fallback coverage areas.

As shown, the example eNodeB includes a wireless communication interface 54 through which to provide coverage and to engage in communication with UEs served by the eNodeB, a backhaul communication interface 56 through which to engage in communication with various network infrastructure (such as an MME, a gateway system, and a server as discussed above), and a controller 58 configured to cause the eNodeB to carry out various eNodeB operations described herein.

The wireless communication interface 54 could include a transceiver configured to serve UEs in accordance with the first radio access technology, along with a power amplifier and antenna structure that radiates to provide for air interface communication between the eNodeB and served UEs. The backhaul communication interface 56 could then comprise a wired or wireless network communication module, such as an Ethernet interface, through which the eNodeB can communicate with other network entities.

The controller 58 could also take various forms, including various combinations of hardware, firmware, and software for instance. By way of example, the controller could comprise a processing unit, such as one or more general purpose processors (e.g., microprocessors) and/or one or more special purpose processors (e.g., application specific integrated circuits), and the controller could comprise non-transitory data storage (e.g., one or more magnetic, optical, and/or flash storage structures). The non-transitory data storage could hold CSFB-candidate data that specifies a proper subset of the fallback coverage areas as CSFB candidates, and the non-transitory data storage could further holds program instructions that are executable by the processing unit to carry out operations (e.g., to cause the eNodeB to carry out operations) in line with the discussion above.

By way of example, the operations could include detecting that, during past CSFB call setup for UEs served by the eNodeB, the UEs reported as a strongest fallback coverage area a fallback coverage area that is not included in the CSFB-candidate data. Further, the operations could include, responsive to the detecting, (i) determining, based on location information and based on an identifier of the reported fallback coverage area, a node of the fallback network that the serving network can contact to facilitate CSFB call setup in the reported fallback coverage area, and (ii) adding to the CSFB-candidate data a record of the reported coverage area in association with a node identifier of the determined node, wherein the added record is thereafter useable by the eNodeB to facilitate CSFB call setup in the reported fallback coverage area for a UE served by the eNodeB.

Various features described above can be applied in this context, and vice versa.

Exemplary embodiments have been described above. Those skilled in the art will understand, however, that changes and modifications may be made to these embodiments without departing from the true scope and spirit of the invention. For instance, while various operations are discussed above as being carried out by the eNodeB, analogous operations could be carried out by other network entities to similarly enable the eNodeB to support improved CSFB service.

We claim:

1. A method for configuring an evolved-Node-B (eNodeB) to facilitate circuit-switched-fallback (CSFB) service, wherein the eNodeB is part of a serving network that operates according to a first radio access technology, wherein the serving network is interconnected with a fallback network that operates according to a second radio access technology different than the first radio access technology and that provides a plurality of fallback coverage areas, and wherein the eNodeB has access to CSFB-candidate data specifying a proper subset the fallback coverage areas as CSFB candidates, the method comprising:

detecting that, during past CSFB call setup for UEs served by the eNodeB, the UEs reported as a strongest fallback coverage area a fallback coverage area that is not included in the CSFB-candidate data; and responsive to the detecting, (i) determining, based on location information and based on an identifier of the reported fallback coverage area, a node of the fallback network that the serving network can contact to facilitate CSFB call setup in the reported fallback coverage area, and (ii) adding to the CSFB-candidate data a record of the reported coverage area in association with a node identifier of the determined node, wherein the added record is thereafter useable by the eNodeB to facilitate the CSFB call setup in the reported fallback coverage area for a UE served by the eNodeB.

2. The method of claim 1, wherein the method is carried out by the eNodeB.

3. The method of claim 2, wherein the first radio access technology is Long Term Evolution, and wherein the second radio access technology is selected from the group consisting of Code Division Multiple Access (CDMA) and Global System for Mobile Communication (GSM).

4. The method of claim 2, wherein determining, based on the location information and based on the identifier of the reported fallback coverage area, the node of the fallback network that the serving network can contact to facilitate the CSFB call setup in the reported fallback coverage area comprises:

querying by the eNodeB a network server to determine, based on the location information and based on an identifier of the reported fallback coverage area, the node of the fallback network that the serving network can contact to facilitate the CSFB call setup in the reported fallback coverage area.

5. The method of claim 4, wherein the network server comprises a centralized-self-organizing-network (CSON) server.

6. The method of claim 4, wherein the location information comprises a geographic location of the eNodeB.

7. The method of claim 4, wherein the location information comprises geographic locations of the UEs that reported the fallback coverage area as the strongest fallback coverage area.

8. The method of claim 2, wherein the determined node of the fallback network is an interworking server (IWS), and wherein the eNodeB uses the added record to facilitate the CSFB call setup in the reported fallback coverage area by providing the node identifier to a mobility management entity (MME) of the serving network to enable the MME to engage in signaling with the IWS.

9. The method of claim 2, wherein the determined node of the fallback network is a mobile switching center (MSC), and wherein the eNodeB uses the added record to facilitate the CSFB call setup in the reported fallback coverage area by providing the node identifier to a mobility management entity (MME) for communication of the node identifier from the MME to an interworking server (IWS) to facilitate signaling from the IWS to the MSC.

10. An evolved-Node-B operable to configure itself to facilitate circuit-switched-fallback (CSFB) service, wherein the eNodeB is part of a serving network that operates according to a first radio access technology, wherein the serving network is interconnected with a fallback network that operates according to a second radio access technology different than the first radio access technology and that provides a plurality of fallback coverage areas, the eNodeB comprising:

a wireless communication interface through which to provide coverage;

a backhaul network communication interface;

a processing unit; and non-transitory data storage, wherein the non-transitory data storage holds CSFB-candidate data specifying a proper subset the fallback coverage areas as CSFB candidates, and wherein the non-transitory data storage further holds program instructions executable by the processing unit to carry out operations comprising:

detecting that, during past CSFB call setup for UEs served by the eNodeB, the UEs reported as a strongest fallback coverage area a fallback coverage area that is not included in the CSFB-candidate data, and responsive to the detecting, (i) determining, based on location information and based on an identifier of the reported fallback coverage area, a node of the fallback network that the serving network can contact to facilitate CSFB call setup in the reported fallback coverage area, and (ii) adding to the CSFB-candidate data a record of the reported coverage area in association with a node identifier of the determined node, wherein the added record is thereafter useable by the eNodeB to facilitate the CSFB call setup in the reported fallback coverage area for a UE served by the eNodeB.

11. The eNodeB of claim 10, wherein the first radio access technology is Long Term Evolution, and wherein the second radio access technology is selected from the group consisting of Code Division Multiple Access (CDMA) and Global System for Mobile Communication (GSM).

12. The eNodeB of claim 10, wherein determining, based on the location information and based on the identifier of the reported fallback coverage area, the node of the fallback network that the serving network can contact to facilitate the CSFB call setup in the reported fallback coverage area comprises:

querying a network server to determine, based on the location information and based on an identifier of the reported fallback coverage area, the node of the fallback network that the serving network can contact to facilitate the CSFB call setup in the reported fallback coverage area.

13. The eNodeB of claim 12, wherein the network server comprises a centralized-self-organizing-network (CSON) server.

14. The eNodeB of claim 12, wherein the location information comprises a geographic location of the eNodeB.

15. The eNodeB of claim 12, wherein the location information comprises locations of the UEs that reported the fallback coverage area as the strongest fallback coverage area.

16. The eNodeB of claim 10, wherein the determined node of the fallback network is an interworking server (IWS), and wherein the eNodeB uses the added record to facilitate the CSFB call setup in the reported fallback coverage area by providing the node identifier to a mobility management entity (MME) of the serving network to enable the MME to engage in signaling with the IWS.

17. The eNodeB of claim 10, wherein the determined node of the fallback network is a mobile switching center (MSC), and wherein the eNodeB uses the added record to facilitate the CSFB call setup in the reported fallback coverage area by providing the node identifier to a mobility management entity (MME) for communication of the node identifier from the MME to an interworking server (IWS) to facilitate signaling from the IWS to the MSC.

\* \* \* \* \*